Patented Nov. 28, 1939

2,181,158

UNITED STATES PATENT OFFICE

2,181,158

OXIDIZED CHLORINATED OLEFIN POLYMER

William J. Sparks, Cranford, and Clifford W. Muessig, Elizabeth, N. J., assignors to Standard Oil Development Company, a corporation of Delaware No Drawing. Application November 30, 1938, Serial No. 243,096

11 Claims. (Cl. 260—94)

This invention relates to synthetic iso-olefin polymer substances, and relates particularly to polymer substances which have been oxidized and chlorinated, and especially to high molecular weight isobutylene polymer substances containing both oxygen and chlorine.

Valuable polymer substances of high molecular weight are produced by a reaction consisting of the polymerization of iso-olefins, such as isobutylene, by means of boron trifluoride, aluminum chloride and similar catalysts, at low temperatures, that is polymers are produced showing molecular weights ranging from 800 to 250,000 or more, which polymers are in general of an oily, plastic or rubbery character depending upon the molecular weight. They have valuable properties for various purposes, but are found to be incompatible with many of the natural and synthetic resins, and insoluble in many of the desirable solvents, particularly oxygen-containing solvents such as the ethers, the ketones, the alcohols, acetone and similar oxygen-containing solvents. This characteristic interferes with many uses of the substances to which they might otherwise be applied.

It has been found that by the application to the polymer of suitable re-agents such as nitric acid, ozone, and mixed nitric and sulphuric acids, at elevated temperatures, a controlled oxidation reaction may be obtained with the polymer substance of any molecular weight, and that the resulting oxidized polymer substance shows many new, useful and valuable properties.

It has also been found possible to chlorinate the same original iso-olefin polymer and still other useful substances are attainable by the chlorination reaction. However, when a large amount of chlorine is introduced into the polymer substance, it tends to become unduly brittle and to lose physical strength, thereby reducing its utility for some purposes.

The present invention is based upon the discovery that the iso-olefin polymer can be first oxidized, and then chlorinated, and that the resulting oxygen-chlorine polymer compound has still other new, useful and unexpected properties. As compared to the unoxidized, unchlorinated polymer, the new polymer is readily soluble in ketones and esters. It may, however, be precipitated from such solution by the addition of low molecular weight alcohols or by water solutions of the alcohols. Furthermore, it is compatible with substantially all of the synthetic and natural varnish gums and resins, being soluble in and compatible with substantially all of the normal paint and lacquer solvents. In addition the polymer which has been both oxidized and chlorinated retains the high strength characteristic of the original polymer, and avoids the brittle, friable character of the ordinary chlorinated polymer even when relatively high percentages of chlorine such as 20% to 50% are reacted into the polymer molecule.

Thus an object of the invention is to modify the physical characteristics of iso-olefin polymer substance in the direction of increasing its solubility, increasing its compatibility with the standard varnish gums and resins, and increasing its strength.

In practicing the invention, the hydrocarbon gases obtained from the cracking operation which is applied to crude petroleum are fractionated to yield a substantially pure isobutylene material. This isobutylene material is then polymerized by contact with boron fluoride at temperatures ranging from $-10°$ C. to $-100°$ C., preferably in an inert diluent-refrigerant. The resulting polymer material has a molecular weight ranging from 800 to 250,000 or more, depending upon the purity of the isobutylene and the polymerization temperature, the purer the material and the lower the temperature, the higher the molecular weight of the resulting polymer.

The polymer material is then treated with mixed nitric and sulphuric acids. This treatment with mixed acids may be applied directly to the isobutylene polymer, or it may be applied to the polymer dissolved in a suitable solvent such as carbon tetrachloride or other inert solvent material such as the saturated liquid hydrocarbons of appropriate boiling point. The treatment with mixed acids is desirably conducted at a temperature between about 95° C. and 135° C. At temperatures below 95°–100° C. the oxidation reaction is undesirably slow, while at temperatures above 125°–135° C., the amount of depolymerization of the polymer may be excessive, and an undesirable amount of charring of the material may occur. An oxidation reaction occurs between the oxygen from the nitric acid and the polymer, to yield an oxidized polymer which may contain from 0.1% to 30% of oxygen according to the amount and concentration of the acids present and the length of time the reaction is allowed to continue. The exact nature of the combination which occurs between the polymer and the oxygen is not definitely known but it is believed that esters, alcohols, acids and ketones of the polymer are formed.

The resulting oxidized polymer may be washed to remove excess acid, and then treated with the chlorine. If desired the chlorine treatment may be conducted in the same hydrocarbon solvent if such is used, but it is preferably dissolved in a chlorine-containing solvent such as chloroform or carbon tetrachloride or mixtures of the two. The chlorination reaction proceeds directly either in the light or in the dark, and catalysts of any sort are not necessary. However, some improvement in the reaction may be obtained by the use of catalysts such as sunlight, aluminum chloride or iodine monochloride as such or as formed by dissolving iodine in the chloroform solution and reacting it with the first of the added chlorine, or other similar catalysts.

A considerable amount of control of the character of the chlorination reaction can be obtained by modification of the temperature at which the reaction occurs, by modification of the speed of chlorination, or the rate at which the chlorine is added, and by the amount of light or catalyst applied to the reacting substances. The very high molecular weight, and the accompanying very high physical dimensions of the polymer molecule leave it subject to depolymerization as the result of a good many different causes, and there is some tendency on the part of the chlorine to cause a depolymerization of the polymer to lower molecular weight substances. This depolymerization effect is more pronounced at higher temperatures and in the dark. Accordingly if a material of moderate to low molecular weight is desired, and the starting material is of high molecular weight, it is possible to degrade or depolymerize the material to the desired extent by chlorinating at an elevated temperature, and chlorinating in the dark. Alternatively, if the maximum molecular weight is desired, with as little depolymerization as possible occurring, the chlorination may be conducted at relatively low temperatures and in a strong light, both of which favor the maximum molecular weight. The exact reasons for this control are not as yet known, but it may be that the limited depolymerization which occurs in the presence of light is due to the more rapid chlorination reaction, and the resulting greatly reduced concentration of dissolved, uncombined chlorine element in the solution.

The chlorination reaction proceeds with the liberation of considerable quantities of hydrochloric acid, indicating that the chlorine displaces hydrogen atoms. It does not appear that any substantial amount of oxygen is displaced from the polymer molecule.

The chlorination reaction may be interrupted when a relatively small amount of chlorine has been combined with the polymer, or it may be continued to completion, for the addition of amounts of chlorine ranging between 1% and 30% or more; the maximum amount of chlorine being determined by the amount of oxidation previously occurring.

When the desired amount of chlorine has been introduced, the chlorinated product may be separated from the solvent by precipitation with alcohol, in which instance a fractional precipitation may be utilized to separate more highly chlorinated portions from less highly chlorinated portions, or for the separation of depolymerized or unduly highly oxidized portions from the chlorinated product which remains soluble in the alcoholized solvent. Alternatively, the solvent may be removed by evaporation or steam distillation, leaving a substantially homogenous mass of the chlorinated material as the residue.

Example 1

A portion of polymer substance prepared as above described having a molecular weight of 13,000 in the amount of 400 grams, is treated with 600 cc. of nitric acid mixed with 50 cc. of sulphuric acid. The reaction continues with the evolution of heat, and the reaction vessel is desirably cooled to keep the temperature between 90° C. and 135° C. to prevent charring or other injury to the polymer. The reaction may continue with stirring over a period of 48 hours, and at the close of the reaction time, the acid may be separated from the oxidized polymer.

Preferably the oxidized polymer is separated from the acid directly but it may be extracted with a solvent, and appropriate purification treatment may be applied as desired.

The purified oxidized polymer having a weight of approximately 450 grams is then preferably dissolved in a mixture of 500 cc. of carbon tetrachloride and 500 cc. of chloroform, and the chlorine bubbled through the solution for a period of 1–2 hours until approximately 65 grams of chlorine have been absorbed yielding a polymer containing about 14% of chlorine.

The solvents may then be removed by volatilization and recovered in appropriate manner if desired.

The resulting polymer is found to have a molecular weight ranging between 11,000 and 13,000, depending upon the temperature of oxidation, and the temperature of chlorination, since both the oxidation reaction and the chlorination reaction tend to depolymerize the original polymer to some extent and therefore reduce its molecular weight.

The resulting oxidized-chlorinated polymer shows a substantial gain in tensile strength and in crushing strength with relatively slight rubbery characteristics, thereby being in contrast to the original polymer. Furthermore the product is substantially non-tacky and substantially free from stickiness.

The resulting polymer may be satisfactorily mixed with most of the usual varnish gums, resins and drying oils such as linseed oil, copal, cellulose esters, dammar, etc., and it is soluble in and compatible with most of the varnish solvents such as turpentine, the hydrocarbon liquids, acetone, benzene, ether, etc.

Example 2

The polyisobutylene polymer may be prepared as above described, the polymerization being continued to the desired molecular weight, and the polymer may then be dissolved in carbon tetrachloride. Conveniently, 60 grams of polymer may be dissolved in 1,000 cc. of carbon tetrachloride. A steady current of ozone is then blown through the solution for a period of time ranging from 5 to 40 hours. A five-hour period of treatment with ozonized air containing a good amount of ozone may result in the incorporation of from 2% to 4% of oxygen. Treatment for a period of 20 hours may incorporate up to 15% of oxygen, and treatment for 40 hours may incorporate from 30% to 40% oxygen, depending to some extent upon the temperature and the ozone concentration in the ozonized air.

Alternatively, the solution of polyisobutylene may be treated with warm nitric acid, or with warm mixed nitric and sulfuric acids at temperatures below the boiling point of the carbon tetrachloride, or with refluxing at the boiling point.

If the oxidation is conducted with ozone, the oxidized material remains dissolved in the carbon tetrachloride, and when the desired amount of oxygen has been incorporated into the polymer, the passage of ozone may be discontinued, and the chlorine substituted for it, either with or without the addition of chloroform which may if desired be added in the proportion of from 5% to 50% of the oxidized solution. The chlorination may be continued as in Example 1 until the desired amount of chlorine is introduced. Alternatively, if the oxidation has been accomplished by the use of the mixed acids, they are desirably decanted from the solution and the solution washed to remove residual traces of acids. The oxidized polymer may be recovered by evaporation of the solvent carbon tetrachloride, and thereafter redissolved in a mixture of carbon tetrachloride and chloroform, for chlorination, or the chlorination may be conducted directly upon the washed solution. In either event the chlorine is passed through the solution until the desired amount is reacted into the polymer. The solvent may then be evaporated and the oxidized, chlorinated polymer recovered.

As above pointed out, relatively little is known of the chemical reaction which occurs in the preparation of the substance of this invention. It seems probable that the original polymerization occurs as follows:

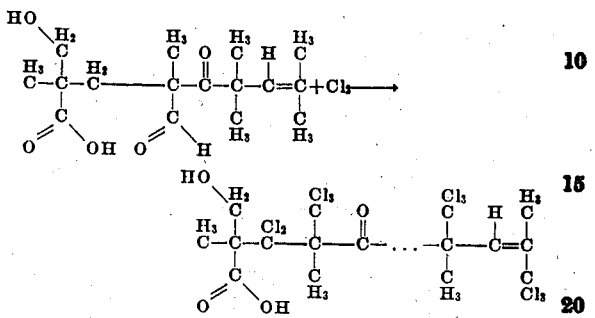

If this equation is correct, it shows the resulting polymer to be a linear, substantially saturated hydrocarbon substance containing probably one unsaturated linkage in the carbon chain, as indicated by experimental data.

Still less is known about the oxidation reaction, but it may be that the reaction proceeds as follows:

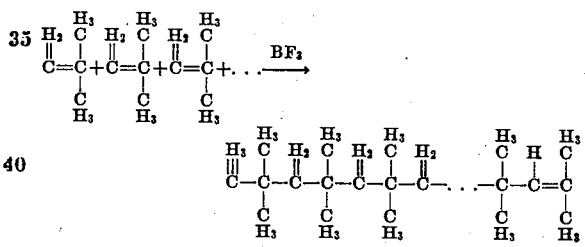

To the present there is no available information to show what proportions of the several alcohols, ketones and acids are produced, nor to show how much ester of the polymer may be produced.

The details of the chlorination reaction as applied to the oxidized polymer are also largely unknown. It appears, however, that the chlorination reaction does not remove oxygen from the polymer, or if oxygen removal occurs, it is relatively small in amount.

Accordingly it appears that once the oxygen has been attached to a given carbon atom, no reaction thereafter occurs for the removal of oxygen and replacement by chlorine. Hence it is probable that only carbon atoms not bound to oxygen atoms participate in the chlorination reaction. If so the chlorination may occur as follows:

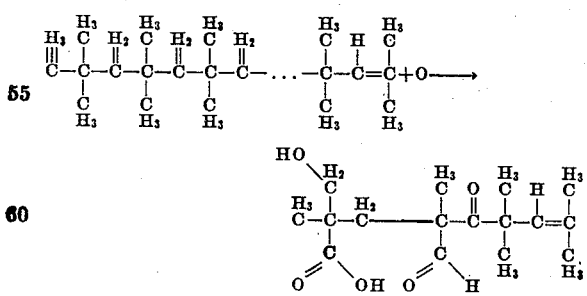

This combination of oxidation and subsequent chlorination is also applicable to the polymer produced by polymerizing together at a low temperature a mixture of polyisobutylene and butadiene. In this instance the reaction proceeds in a manner closely analogous to that of Example 1, to yield a corresponding product.

The oxidized-chlorinated polymer material is thermoplastic but melts over a range of temperature, and is particularly advantageous for thermo-plastic molding either in the pure form, or particularly when mixed with the usual fillers, such as wood flour, dyes, pigments, etc. It is also compatible with rubber, the synthetic rubbers and the various organic plastics, and may be combined with them to yield many valuable compositions.

Thus the invention provides a new and useful material and product consisting of an oxidized-chlorinated iso-olefin polymer; and the process of polymerizing, oxidizing and chlorinating iso-olefin substance and the further process steps of compounding the oxidized-chlorinated polymer with various varnish gums, resins, solvents, etc.

The above presented examples of the invention utilize for the polymer, the simple polymer of isobutylene. The invention is not, however, limited to the use of isobutylene alone as the raw material. There are various other analogous polymers, such as polyethylene, polypropylene, polyamylene and mixed polymers of the several olefinic substances, and these materials also are substantially saturated or nearly saturated linear hydrocarbon polymers of high molecular weight, and they also are similarly reactive under analogous reaction conditions in common with the polyisobutylene as above described and similar advantageous results are obtainable by the oxidation and chlorination steps.

While there are above disclosed but a limited number of embodiments of the material and process of the invention, it is possible to produce still other embodiments of the invention resulting in products of modified properties without departing from the inventive concept above disclosed, and it is therefore desired that only such limitations be imposed upon the appended claims as are stated therein or required by the prior art.

The invention claimed is:

1. A high molecular weight oxidized, chlorinated, olefinic polymer.

2. A high molecular weight oxidized, chlorinated, iso-olefinic polymer.

3. A linear isobutylene polymer containing substituted oxygen and chlorine.

4. A high molecular weight, substantially saturated linear hydrocarbon polymer containing oxygen and chlorine.

5. The process of preparing a synthetic substance comprising the steps of polymerizing an iso-olefin to a high molecular weight, oxidizing the polymer, and thereafter chlorinating the oxidized polymer.

6. The process of preparing a synthetic substance comprising the steps of polymerizing isobutylene to a high molecular weight, oxidizing the polymer, and thereafter chlorinating the oxidized polymer.

7. The process of preparing a synthetic substance comprising the steps of polymerizing isobutylene to a high molecular weight, and oxidizing the polymer by the application thereto of mixed nitric and sulphuric acids.

8. The process of preparing a synthetic substance comprising the steps of treating isobutylene in solution at a low temperature with a polymerizing catalyst, separating the polymer from the solution and catalyst, oxidizing the polymer by treatment with mixed nitric and sulphuric acids at a temperature ranging between 90° C. and 135° C., removing the acids, and treating the oxidized polymer in solution with chlorine.

9. The process of preparing a synthetic substance comprising the steps of treating isobutylene in solution at a low temperature with a polymerizing catalyst, separating the polymer from the solution and catalyst, oxidizing the polymer by treatment in solution in a non-oxidizable solvent with mixed nitric and sulphuric acids at a temperature ranging between 90° C. and 135° C., removing the acids, and treating the oxidized polymer in solution with chlorine.

10. The process of preparing a synthetic substance comprising the steps of treating isobutylene in solution at a low temperature with a polymerizing catalyst, separating the polymer from the solution and catalyst, oxidizing the polymer by treatment in solution in a non-oxidizable solvent with mixed nitric and sulphuric acids at a temperature ranging between 90° C. and 135° C., removing the acids, and treating the oxidized polymer in solution with carbon tetrachloride.

11. The process of preparing a synthetic substance comprising the steps of treating isobutylene in solution at a low temperature with a polymerizing catalyst, separating the polymer from the solution and catalyst, oxidizing the polymer by treatment in solution with ozone and treating the oxidized polymer in solution with elemental chlorine.

WILLIAM J. SPARKS.
CLIFFORD W. MUESSIG.